3,530,498
ANTIFUNGAL USE OF ORGANOTIN COMPOUNDS

Tatsuo Katsumura, Suita-shi, Yohei Kawakami, Takatsuki-shi, and Hiroshi Tsuji, Kishiwada-shi, Japan, assignors to Nitto Chemical Industrial Co., Ltd., Osaka, Japan, a corporation of Japan
No Drawing. Original application Aug. 31, 1964, Ser. No. 393,343, now Patent No. 3,441,580, dated Apr. 29, 1969. Divided and this application Mar. 4, 1968, Ser. No. 730,966
Claims priority, application Japan, Aug. 31, 1963, 38/45,525
Int. Cl. A01n 9/00
U.S. Cl. 424—288       3 Claims

ABSTRACT OF THE DISCLOSURE

A process is provided for inhibiting the growth on human apparel of fungi and odors due thereto by applying to the locus of the perspiration a compound of the formula $R_3SnO(CH_2CH_2O)_mCH_2CH_2OSnR_3$ wherein R is selected from the group consisting of propyl and butyl, and $m$ is an integer greater than 5.

---

This application is a divisional application of application Ser. No. 393,343, filed Aug. 31, 1964, now U.S. Pat. 3,441,580.

This invention relates to novel compounds and their use in preventing the growth of fungi and odors on various articles including human apparel.

Human apparel such as underwear, stockings, and other clothes, footwear, including shoes, etc., may develop disagreeable odors because of the action of microorganisms on perspiration, particularly under conditions of high temperature and humidity. Synthetic fibers, which are not hygroscopic, offer particularly fertile conditions for the growth of microorganisms.

It is an object of this invention to provide novel compounds which are particularly useful in preventing the growth of microorganisms. It is a further object of this invention to provide novel compounds and processes suitable for application to human apparel. Further objects will be apparent to those skilled in the art upon reading the following disclosure.

In accordance with certain or its aspects, this invention relates to novel compounds of the formula

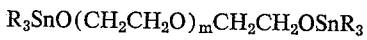

wherein R is selected from the group consisting of propyl and butyl, and $m$ is an integer greater than 5.

The value of $m$ in the compounds of this invention may preferably be between 5 and 300. When $m$ is less than about 15, the compound may typically be an oil. When $m$ is about 30, the compound may be a wax, and when $m$ is more than 100, the compound may be a solid.

The compounds of this invention may be obtained in substantially quantitative yield by heating together an organotin oxide selected from the group consisting of bis(tripropyltin) oxide and bis(tributyltin) oxide with a polyethylene glycol having the desired degree of polymerization, i.e. a polyethylene glycol or the formula

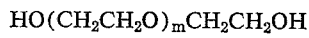

The reactants may be heated to remove water produced by the reaction. Preferably, the reaction may be conducted in a hydrocarbon solvent which forms an azeotrope with water, e.g. benzene, toluene, etc., and the water formed may be removed by distilling the azeotrope.

It is a particular feature of these high molecular weight organotin compounds of this invention that they possess substantially no odor and produce no irritation when applied to human apparel. It is a further advantage that they permit control or odor and microorganisms at a low tin content. It is believed that the solubility of these substances in both oil and water allow them to penetrate the tissues of microorganisms.

It is known that fabrics treated with conventional sanitizing agents lose their biological activity after laundering. The process of this invention is particularly advantageous because it may be carried out in homes, work places, etc. Because the compounds of this invention are readily prepared at low cost, it is feasible to treat fabrics after each laundering.

The compounds of this invention may be applied to the article to be treated by any convenient method. Preferably, it may be applied in the form of a solution or dispersion containing at least about 0.001% of the tin compounds. The solvent employed may be an organic solvent such as methyl alcohol, ethyl alcohol, propyl alcohol, acetone, etc. The compound may be dissolved or dispersed in an aqueous solvent, with a surface active agent or the like if desired. Preferably, the solution may be applied by spraying, e.g. with a hand sprayer or an aerosol spray device such as those employing propellants such as propane, butane, freon, etc. Where the solvent employed has good volatility, treated apparel may be worn immediately after treatment.

Practice of certain specific embodiment of this invention may be observed from the following illustrative examples.

EXAMPLE 1

A 300 ml. spray container was charged with 170 ml. of ethyl alcohol, 0.2 g. of the waxy product obtained by reacting together 14.3 g. of bis(tripropyltin) oxide and 42 g. of polyethylene glycol having an average molecular weight of 1500, and pressurized with 130 ml. of propane. Individual nylon stockings weighing 18 g. were sprayed with this solution for 10 seconds at a distance of about 15 cm. The amount of tin compound deposited was 2 mg. which corresponds to a treatment of 0.01%.

Twenty workers in a chemical factory, wearing rubber-soled, canvas shoes, wore one treated and one untreated sock for a period of one week during severe conditions in July. All of the 20 untreated socks developed disagreeable odors within 1 day whereas no disagreeable odor developed on the treated socks after one week. None of the workers developed any inflamation from the treatment.

EXAMPLE 2

A hand sprayer was charged with 100 ml. of propyl alcohol and 0.1 g. of the waxy product obtained by reacting 120 g. of bis(tributyltin) oxide and 80 g. of polyethylene glycol having average molecular weight of 400. Approximately 2 ml. of this solution was sprayed on the inside of individual leather shoes. The amount of tin compound deposited was 2 mg. Each of twenty workers in a chemical factory wore one treated shoe and one untreated shoe for a period of 3 days during the rainy season from May to June. All 20 untreated shoes developed disagreeable odors after one day whereas the treated shoes did not develop disagreeable odors after 3 days. It was also noted that when the untreated shoes were stored for one week after the experiment, they developed a considerable growth of fungi, while no fungus growth was observed on the treated shoes. It was also observed that shoes treated with these compounds were maintained free of fungus growth for a full season while fungus growth was observed on untreated shoes.

EXAMPLE 3

A hand sprayer was charged with 500 ml. of ethyl alcohol and 1 g. of the compound prepared by the reaction of 120 g. of bis(tributyltin) oxide and 80 g. of polyethylene glycol having an average molecular weight of 400. Baseball uniforms were sprayed as evenly as possible at the rate of about 100 ml. of solution per uniform. The amount of tin compound deposited was 0.2 g. per uniform having a weight of about 930 g. for a treatment of 0.02%.

Eight members of a baseball team wore the treated uniforms while 7 members wore untreated uniforms. The experiment was conducted in August. After wearing, the uniforms were placed in lockers. After 2 weeks, a considerable growth of fungus and a disagreeable odor were observed on the untreated uniforms. The treated uniforms had no disagreeable odor and no fungus growth. None of the members wearing treated uniforms developed dermatitis as a result of the treatment.

Although this invention has been illustrated by reference to specific examples, numerous changes and modifications thereof which clearly fall within the scope of the invention will be apparent to those skilled in the art.

We claim:

1. The process for inhibiting the growth on human apparel of fungi and odors due thereto comprising applying to the said apparel an effective fungi inhibiting amount of a compound of the formula $$R_3SnO(CH_2CH_2O)_mCH_2CH_2OSnR_3$$

wherein R is selected from the group consisting of propyl and butyl, and $m$ is an integer greater than 5.

2. The process as described in claim 1 in which said applying step is carried out by spraying said compound on said apparel.

3. The process claimed in claim 1 wherein $m$ is an integer between 5 and 300.

References Cited

UNITED STATES PATENTS

| | | | |
|---|---|---|---|
| 3,129,236 | 4/1964 | Weissenberger | 260—429.7 |
| 3,242,201 | 3/1966 | Cramer et al. | 260—429.7 |
| 3,441,580 | 4/1969 | Katsumura et al. | 260—429.7 |

ALBERT T. MEYERS, Primary Examiner

F. E. WADDELL, Assistant Examiner

U.S. Cl. X.R.

424—342